US012673601B2

(12) United States Patent

Speichermann et al.

(10) Patent No.: US 12,673,601 B2
(45) Date of Patent: Jul. 7, 2026

(54) MOBILE APPARATUS FOR HANDLING A TRACTION BATTERY OF AN ELECTRIC VEHICLE

(71) Applicant: Dr. Ing. h.c. F. Porsche Aktiengesellschaft, Stuttgart (DE)

(72) Inventors: Justus Speichermann, Stuttgart (DE); Christoph Orth, Marbach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 581 days.

(21) Appl. No.: 18/138,928

(22) Filed: Apr. 25, 2023

(65) Prior Publication Data

US 2023/0356645 A1 Nov. 9, 2023

(30) Foreign Application Priority Data

May 9, 2022 (DE) ..................... 10 2022 111 428.7

(51) Int. Cl.
| | |
|---|---|
| *B60P 3/14* | (2006.01) |
| *A62C 3/07* | (2006.01) |
| *A62C 3/16* | (2006.01) |
| *B60L 53/00* | (2019.01) |
| *B60P 1/54* | (2006.01) |

(52) U.S. Cl.
CPC .................. *B60P 3/14* (2013.01); *A62C 3/07* (2013.01); *A62C 3/16* (2013.01); *B60P 1/54* (2013.01); *B60L 53/00* (2019.02)

(58) Field of Classification Search
None
See application file for complete search history.

(56) References Cited

U.S. PATENT DOCUMENTS

| | | | | |
|---|---|---|---|---|
| 9,145,082 | B2 * | 9/2015 | Hindle | ...................... B60P 3/00 |
| 11,091,044 | B2 | 8/2021 | Enthaler et al. | |
| 12,012,009 | B2 * | 6/2024 | Koelsch | ................. B60L 53/35 |
| 2012/0010894 | A1 | 1/2012 | Jammer | |
| 2022/0309473 | A1 | 9/2022 | Weissbrich et al. | |

OTHER PUBLICATIONS

German Search Report dated Sep. 29, 2022.

* cited by examiner

*Primary Examiner* — Aaron L Lembo
(74) *Attorney, Agent, or Firm* — Buchanan Ingersoll & Rooney PC

(57) ABSTRACT

A mobile apparatus for handling a traction battery (100) of an electric vehicle is provided. The mobile apparatus may have a crane (109) for moving the traction battery (100). The apparatus includes a structure (101) of a truck or a trailer. A system (102, 103, 105, 107) for handling and/or analyzing the traction battery (100) is arranged in the interior of the structure (101).

19 Claims, 1 Drawing Sheet

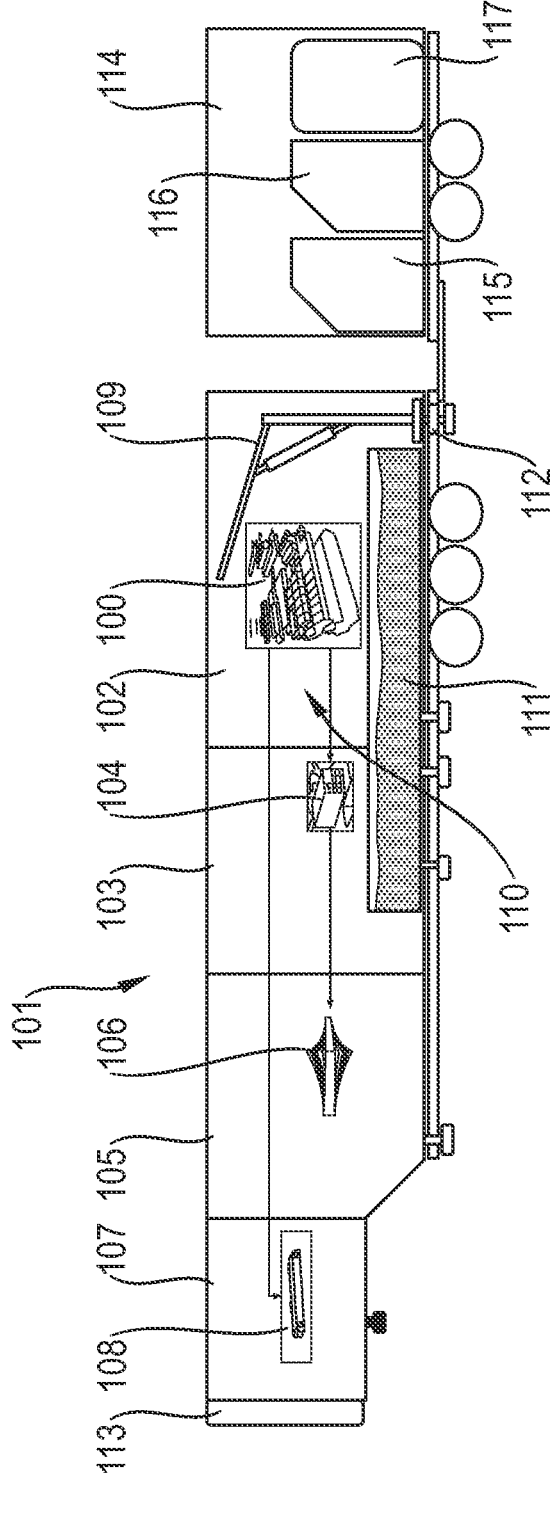

MOBILE APPARATUS FOR HANDLING A TRACTION BATTERY OF AN ELECTRIC VEHICLE

CROSS REFERENCE TO RELATED APPLICATION

This application claims priority on German Patent Application No 10 2022 111 428.7 filed May 9, 2022, the entire disclosure of which is incorporated herein by reference.

BACKGROUND

Field of the Invention

The invention relates to a mobile apparatus for handling a traction battery of an electric vehicle.

Related Art

Traction batteries are high-voltage batteries that, in the event of a fault, are transported to special battery analysis centers with great effort.

US 2012010894 A1 discloses a service station with a capability of analyzing a battery of an electric vehicle with respect to functionality. However, the electric vehicle must be moved to the service station for analysis.

An object of the invention is to provide a mobile apparatus for handling a high-voltage battery.

SUMMARY OF THE INVENTION

An apparatus for handling a traction battery of the electric vehicle comprises a structure of a truck or a trailer, and a system for handling the traction battery is arranged in the interior of the structure.

A holding apparatus for the traction battery is arranged in the structure. Thus, the traction battery is securely stored in a structure for deactivation, analysis, and/or repair.

In some embodiments, a crane is arranged in or on the structure. More particularly, the structure comprises a side wall that is at least partially openable, and the crane is configured to load the traction battery into the structure through the at least partially opened side wall. Thus, the traction battery can be brought safely brought into the structure.

Some embodiments have a fire safety system arranged in the structure. The fire safety may be an extinguishing system, such as an extinguishing system that is configured to be connectable to a fire safety device outside the structure and/or a basin that is fillable or filled with water. The basin can be filled from the outside and unloaded or activated. A cooling circuit and a water filtration apparatus can be provided.

The holding apparatus and the basin may be arranged such that the traction battery can be unloaded from the holding apparatus into the basin. The crane and the basin may be arranged such that the traction battery is pivotable with the crane over the basin and can be unloaded into the basin.

Some embodiments have at least one support apparatus arranged on the structure and configured to statically secure the structure in case of a filled basin.

A terminal for a protective conductor may be arranged on the outside of the structure, and the terminal may be connected electrically to electrically conductive grounding points mounted on the inside of the structure.

The structure of some embodiments comprises a region secured against electrostatic discharges. This embodiment allows for safe work with electronics.

A discharge electric or discharge electronics for charging and/or discharging the traction battery or a cell module of the traction battery may be arranged in the interior of the structure. As a result, the traction battery can be charged or completely deactivated.

The structure of some embodiments comprises an air-conditioning system in a hermetically lockable region of the structure. The air-conditioning system is configured to generate and/or control defined temperature and humidity conditions, to generate and/or control a defined negative pressure against an ambient environment of structure, to generate and/or control a defined air flow to avoid the escape of pollutants with air filtration, and/or to produce defined ambient conditions for technical cleanliness when working in the structure.

The structure may comprise a personnel airlock.

The structure of some embodiments is air-tightly connectable to a trailer comprising containers for used metal or hazardous goods. As a result, portions of the traction battery can be safely removed after deactivation, disassembly and transformation into a defined state.

Some embodiments of the structure comprise a storage space for a temperature change chamber, a microscope, high-voltage safety equipment, an explosion-protected metal shredder, and/or a container or several containers for collecting liquids.

The structure may comprise externally mounted hooks or ears for attaching sun screens and/or privacy screens.

A communication device for video conferencing or data transfer may be in or communicate with the structure.

The structure of some embodiments comprises a region for high voltage. This region can be used to disable, analyze and/or repair the traction battery. More particularly, the structure may comprise a region for high voltage and low voltage and may be configured to analyze a cell module of the traction battery. This part of the structure may comprise a laboratory region that is configured to analyze a cell of the cell module. The structure also may comprise a region for analyzing an electrical component of the traction battery, the cell module, or the cell, and/or the structure may comprise a region configured as an office.

Further embodiments will emerge from the following description and the drawings.

BRIEF DESCRIPTION OF THE DRAWINGS

FIG. 1 a schematic illustration of a mobile apparatus for handling a traction battery of an electric vehicle.

DETAILED DESCRIPTION

FIG. 1 schematically shows a mobile apparatus for handling a traction battery 100 of an electric vehicle. The mobile apparatus will be described using the example of a structure 101 of a trailer for a truck. The mobile apparatus also can be a structure of a truck.

The structure 101 comprises a high-voltage region 102 configured to deactivate, analyze, and/or repair the traction battery 100.

The structure 101 comprises a high-voltage and low-voltage region 103 configured to analyze a cell module 104 of the traction battery 100.

The structure 101 also comprises a laboratory region 105 configured to analyze a cell 106 of the cell module 104.

The structure 101 comprises a region 107 for analyzing an electrical component 108 of the traction battery 100, the cell module 104, or the cell 106. In this example, the region 107 is configured to be secured against electrostatic discharge.

The structure 101 also has a region configured as an office 107. A separate region for the office can be provided. A different division of the regions or a structure 101 without different regions can be provided. Thus, the structure 101 forms a system for handling the traction battery 100.

A crane 109 is arranged in or on the structure 101.

The structure 101 comprises a side wall 110 that is at least partially openable, and the crane 109 is configured to load the traction battery 100 into the structure 101 through the at least partially opened side wall 110.

A holding apparatus for the traction battery 100 can be arranged in the structure 101. The crane 109 can be the holding apparatus or can be configured to move the traction battery 100 towards the holding apparatus.

In one example, the structure 101 comprises a fire safety system. In the example, the structure 101 comprises a basin 111 in the structure 101. The basin 111 is fillable with water, and is filled with water in the illustrated example.

The holding apparatus and the basin 111 can be arranged such that the traction battery 100 can be unloaded from the holding apparatus into the basin 111.

The crane 109 and the basin 111 are arranged such that the traction battery 100 is pivotable with the crane 109 over the basin 111 and can be unloaded into the basin 111.

The fire safety system can comprise an extinguishing system (not shown in FIG. 1). For example, the extinguishing system is configured to be connectable to a fire safety device outside of the structure 101.

In the illustrated example, at least one support apparatus 112 is arranged on the structure 101 and is configured to statically secure the structure 101 with a filled basin 111. In the example, the support apparatus 112 comprises several lateral supports.

A terminal for a protective conductor, in particular a PE protective conductor, can be arranged on the outside of the structure 101. The terminal can be connected in an electrically conductive manner to grounding points mounted on the inside of the structure 101.

A discharge electric or discharge electronics for charging and/or discharging the traction battery 100 or a cell module 104 of the traction battery 100 is arranged in the interior of the structure 101.

The structure 101 may comprise a hermetically lockable region. In the illustrated example, the interior of the structure 101 or the region 107 is the hermetically lockable region.

The structure 101 of some embodiments comprises an air-conditioning system 113. For example, the air-conditioning system 113 is configured to generate and/or control defined temperature and humidity conditions in the hermetically lockable region of the structure 101. The air-conditioning system 113 also may be configured to generate a defined negative pressure in the hermetically lockable region of the structure 101 in relation to an ambient environment of the structure 101. In some embodiments, the air-conditioning system 113 is configured to generate a defined air flow in the hermetically lockable region of the structure 101. In one example, the air-conditioning system 113 is configured to avoid a leakage of pollutants with air filtration. In one example, the air-conditioning system 113 is configured so as to produce defined ambient conditions for technical cleanliness when working in the structure 101.

In one embodiment, the structure 101 comprises a personnel airlock (not shown in FIG. 1).

In one example, the structure 101 is air-tightly connectable to a trailer 114. The trailer 114 may comprise containers for used metal or hazardous goods. In the example, the trailer 114 comprises a container 115 for copper, a container 116 for aluminum, and a container 117 for solvent.

In one example, the structure 101 comprises a storage space for a temperature change chamber, a microscope, high-voltage safety equipment, an explosion-protected metal shredder, and/or a container or several containers for collecting liquids.

In some embodiments, the structure 101 comprises hooks or ears mounted externally on the structure 101 for attaching sun screens and/or privacy screens.

The structure 101 may further comprise a communication device for video conferencing or data transfer.

The invention claimed is:

1. A mobile apparatus for handling a traction battery (100) of an electric vehicle, comprising a structure (101) of a truck or a trailer, the structure (101) having an interior, and a system (102, 103, 105, 107) for handling the traction battery (100) being arranged in the interior of the structure (101), a holding apparatus (109) arranged in the structure (101) and being configured for holding the traction battery (100) a crane (109) arranged in or on the structure (101), the structure (101) having a side wall (110) that is at least partially openable, the crane (109) being configured to load the traction battery (100) into the structure (101) through the at least partially opened side wall (110).

2. The apparatus of claim 1, further comprising a fire extinguishing system arranged in the structure (101) and being configured to be connectable to a fire safety device outside the structure (101), the fire extinguishing system comprising a basin (111) that is fillable with water.

3. The apparatus of claim 2, wherein the crane (109) and the basin (111) are arranged such that the traction battery (100) is pivotable with the crane (109) over the basin (111) and can be unloaded into the basin (111).

4. The apparatus of claim 3, further comprising at least one support apparatus (112) arranged on the structure (101) and configured to secure the structure (101) statically in the basin (111).

5. The apparatus of claim 1, further comprising a terminal for a protective conductor arranged outside of the structure (101), the terminal being connected in an electrically conductive manner to grounding points mounted on the inside of the structure (101).

6. The apparatus of claim 1, wherein the structure (101) comprises a region (107) that is secured against electrostatic discharges.

7. The apparatus of claim 1, further comprising a discharge electric or discharge electronics for charging and/or discharging the traction battery (100) or a cell module (104) of the traction battery (100), the discharge electric or discharge electronics being arranged in the interior of the structure (101).

8. The apparatus of claim 1, wherein the structure (101) is air-tightly connectable to a trailer (114) that comprises containers (115, 116, 117) for used metal or hazardous goods.

9. The apparatus of claim 1, characterized in that the structure (101) comprises a storage space for a temperature change chamber, a microscope, high-voltage safety equipment, an explosion-protected metal shredder, and/or at least one container for collecting liquids.

10. The apparatus of claim 1, wherein the structure (101) comprises externally mounted hooks or ears for attaching screens.

11. The apparatus of claim 1, wherein the structure (101) comprises a communication device for video conferencing or data transfer.

12. The apparatus of claim 1, wherein the structure (101) comprises: a region (102) for high voltage that is used to disable, analyze and/or repair the traction battery.

13. A mobile apparatus for handling a traction battery (100) of an electric vehicle, comprising a structure (101) of a truck or a trailer, the structure (101) having an interior, and a system (102, 103, 105, 107) for handling the traction battery (100) being arranged in the interior of the structure (101), wherein the structure (101) comprises a hermetically lockable region of the structure (101), an air-conditioning system (113) that is configured to generate and/or control defined temperature and humidity conditions, to generate and/or control a defined negative pressure relative to a defined ambient environment of the structure, to generate and/or control a defined air flow for avoiding an escape of pollutants with air filtration, or to produce defined ambient conditions for technical cleanliness when working in the structure.

14. The apparatus of claim 13, further comprising a holding apparatus (109) arranged in the structure (101) and configured for holding the traction battery (100).

15. The apparatus of claim 14, further comprising a crane (109) arranged in or on the structure (101), the structure (101) having a side wall (110) that is at least partially openable, and the crane (109) being configured to load the traction battery (100) into the structure (101) through the at least partially opened side wall (110).

16. The apparatus of claim 13, wherein the structure (101) comprises a personnel airlock.

17. A mobile apparatus for handling a traction battery (100) of an electric vehicle, comprising a structure (101) of a truck or a trailer, the structure (101) having an interior, and a system (102, 103, 105, 107) for handling the traction battery (100) being arranged in the interior of the structure (101), wherein the structure (101) comprises: a region (103) for high voltage and low voltage that is configured to analyze a cell module of the traction battery.

18. The apparatus of claim 17, wherein the structure (101) comprises: a laboratory region (105) configured to analyze a cell of the cell module.

19. The apparatus of claim 1, wherein the structure (101) comprises: a region (107) configured as an office.

* * * * *